(12) United States Patent
Battle et al.

(10) Patent No.: US 11,260,813 B1
(45) Date of Patent: Mar. 1, 2022

(54) VEHICLE DENT PROTECTION SYSTEM

(71) Applicants: Jamall Battle, Hampton, VA (US); Rashawn Daniels, Hampton, VA (US)

(72) Inventors: Jamall Battle, Hampton, VA (US); Rashawn Daniels, Hampton, VA (US)

( * ) Notice: Subject to any disclaimer, the term of this patent is extended or adjusted under 35 U.S.C. 154(b) by 0 days.

(21) Appl. No.: 16/934,084

(22) Filed: Jul. 21, 2020

(51) Int. Cl.
*B60R 19/38* (2006.01)
*B60R 19/46* (2006.01)
*B60R 19/18* (2006.01)
*B60R 19/44* (2006.01)

(52) U.S. Cl.
CPC .............. *B60R 19/46* (2013.01); *B60R 19/18* (2013.01); *B60R 19/38* (2013.01); *B60R 19/445* (2013.01); *B60R 2019/1833* (2013.01)

(58) Field of Classification Search
CPC ......... B60R 19/38; B60R 19/42; B60R 19/46; B60R 19/445
USPC ................................................ 293/118, 128
See application file for complete search history.

(56) References Cited

U.S. PATENT DOCUMENTS

| 4,217,715 | A | 8/1980 | Bryan, Jr. | |
| D301,861 | S | 6/1989 | Muschette | |
| 7,354,083 | B1 | 4/2008 | Obermann | |
| 8,146,935 | B1 * | 4/2012 | Adams | B60R 25/01 280/166 |
| 9,180,824 | B1 | 11/2015 | Rodriguez | |
| 9,308,880 | B1 | 4/2016 | Johnson | |
| 9,994,168 | B1 | 6/2018 | Jensen | |
| 10,046,707 | B2 | 8/2018 | Churchwell | |
| 10,906,488 | B2 * | 2/2021 | Santiago | B60R 13/043 |
| 2015/0291116 | A1 | 10/2015 | Pi | |

FOREIGN PATENT DOCUMENTS

DE 102018103812 8/2018

* cited by examiner

*Primary Examiner* — Joseph D. Pape
(74) *Attorney, Agent, or Firm* — Kyle A. Fletcher, Esq.

(57) ABSTRACT

The vehicle dent protection system attaches to and protects a vehicle from dents while said vehicle is parked. A plurality of instantiations of the vehicle dent protection system are attached to the vehicle such that the plurality of instantiations form a protected space around the vehicle. The vehicle dent protection system is a sacrificial structure that receives and dissipates an impact before the impact can damage the vehicle. The vehicle dent protection system includes a plurality of telescopic structures, a plurality of pivot structures, a sacrificial module, and a frame mount. The plurality of pivot structures interconnect the plurality of telescopic structures such that the plurality of telescopic structures can rotate. The plurality of telescopic structures attach the sacrificial module to the frame mount such that the position of the sacrificial structure relative to the frame mount is adjustable.

18 Claims, 8 Drawing Sheets

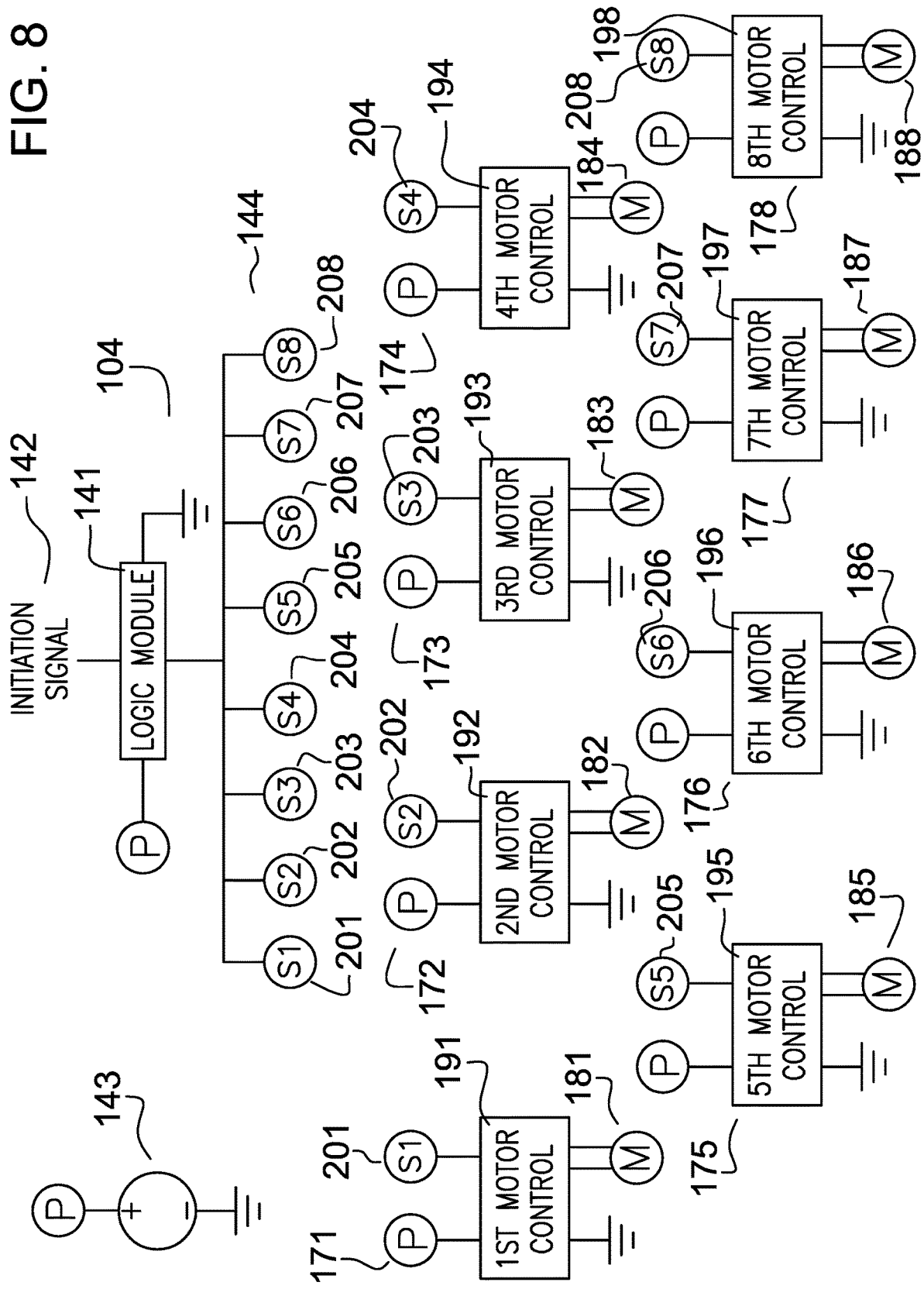

VEHICLE DENT PROTECTION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including body finishing, more specifically, guard strip for a vehicle. (B60R13/04)

SUMMARY OF INVENTION

The vehicle dent protection system is a mechanical structure. The vehicle dent protection system is configured for use with a vehicle. The vehicle dent protection system attaches to the vehicle. A plurality of instantiations of the vehicle dent protection system are attached to the vehicle such that the plurality of instantiations forms a protected space around the vehicle. The vehicle dent protection system is a sacrificial structure that receives and dissipates an impact before the impact can damage the vehicle. The vehicle dent protection system comprises a plurality of telescopic structures, a plurality of pivot structures, a sacrificial module, and a frame mount. The plurality of pivot structures interconnect the plurality of telescopic structures such that the plurality of telescopic structures can rotate. The plurality of telescopic structures attach the sacrificial module to the frame mount such that the position of the sacrificial structure relative to the frame mount is adjustable. The frame mount attaches the vehicle dent protection system to the vehicle.

These together with additional objects, features and advantages of the vehicle dent protection system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle dent protection system in detail, it is to be understood that the vehicle dent protection system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle dent protection system.

It is therefore important that the claims be regarded as including such equivalent construction insofar as they do not depart from the spirit and scope of the vehicle dent protection system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 8 is a schematic view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
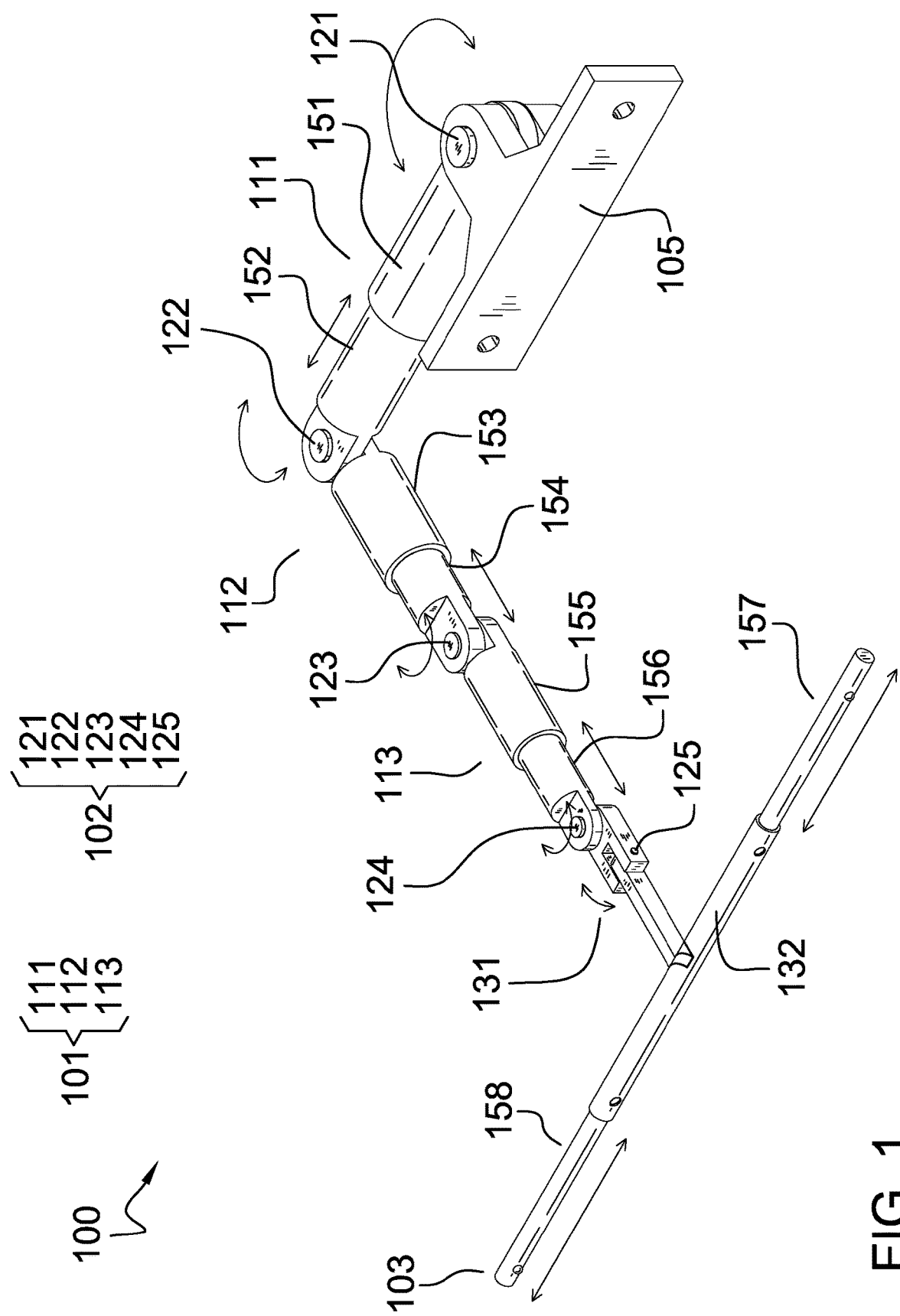
FIG. 1 is a perspective view of an embodiment of the disclosure.
Figure 2:
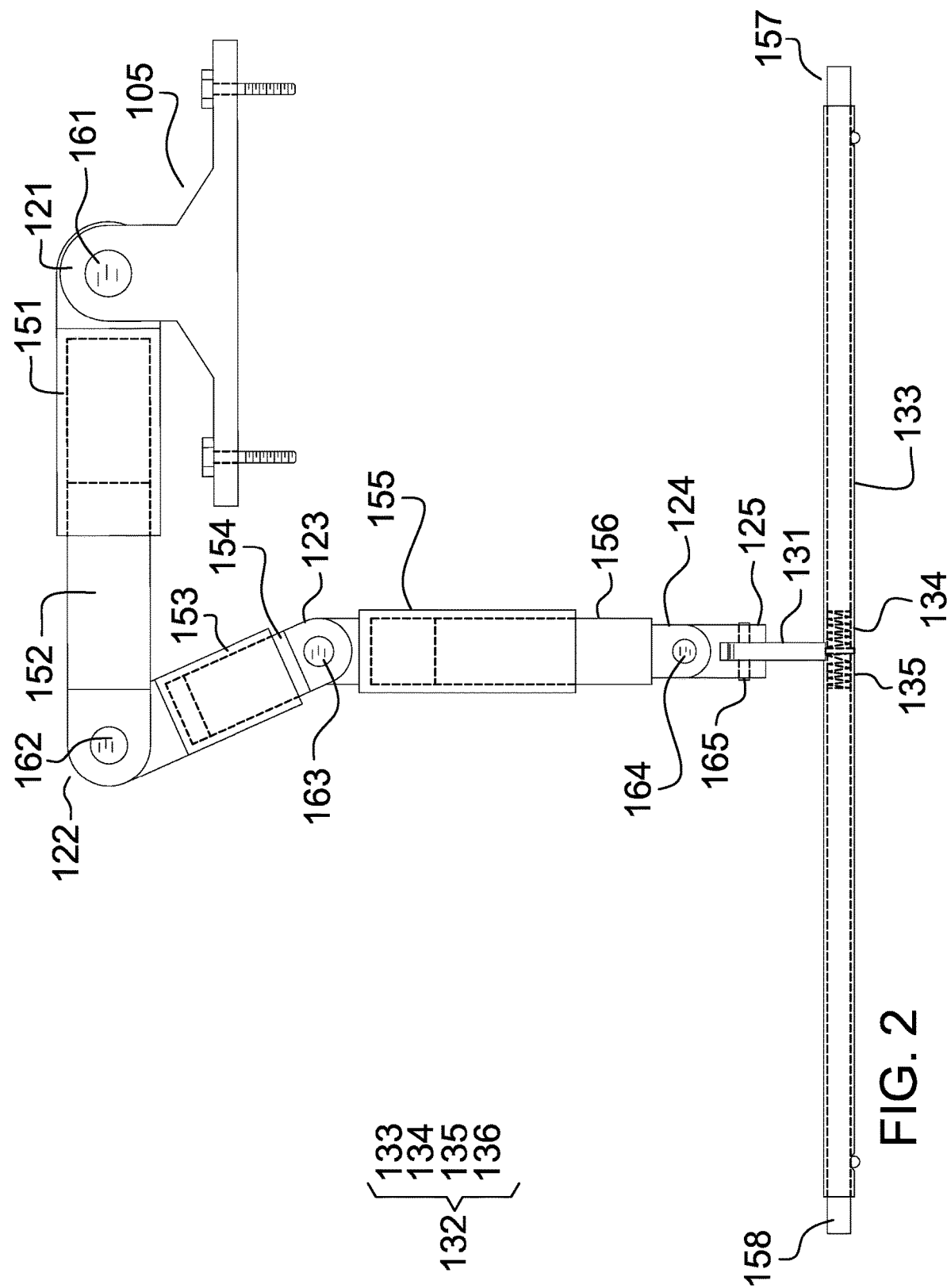
FIG. 2 is a front view of an embodiment of the disclosure.
Figure 3:
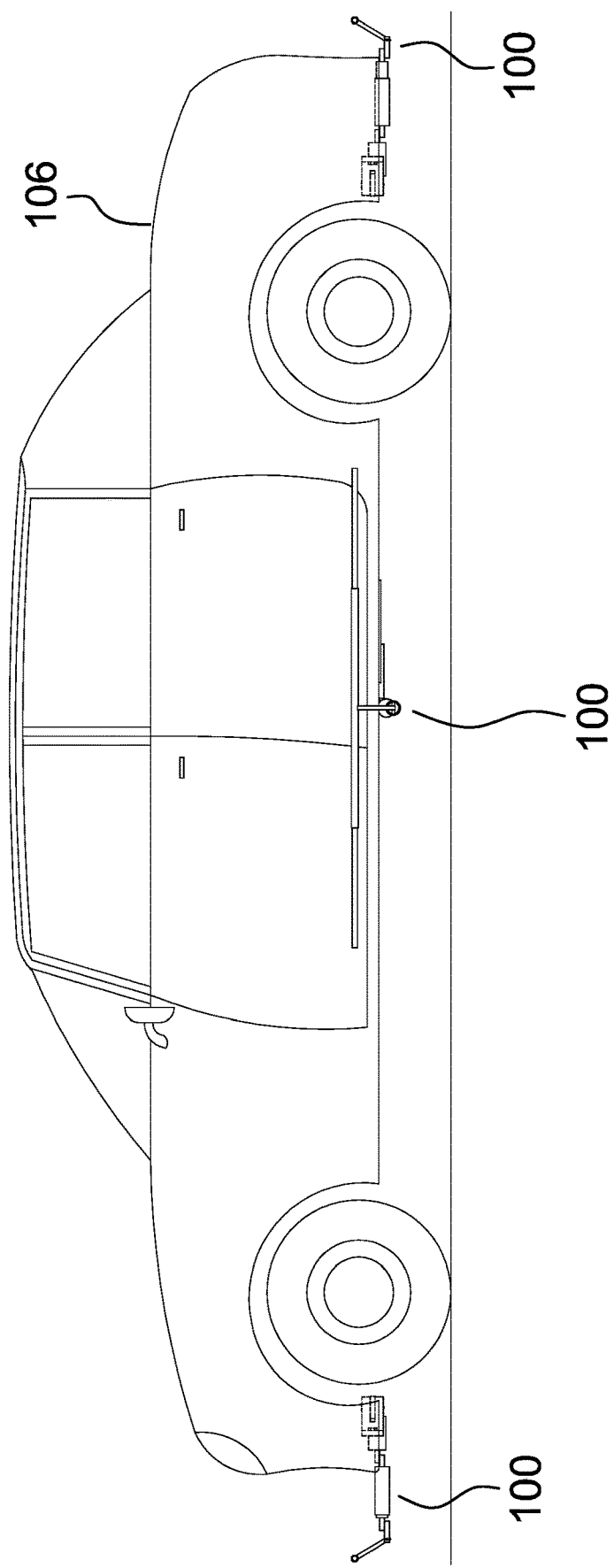
FIG. 3 is an in-use view of an embodiment of the disclosure.
Figure 4:
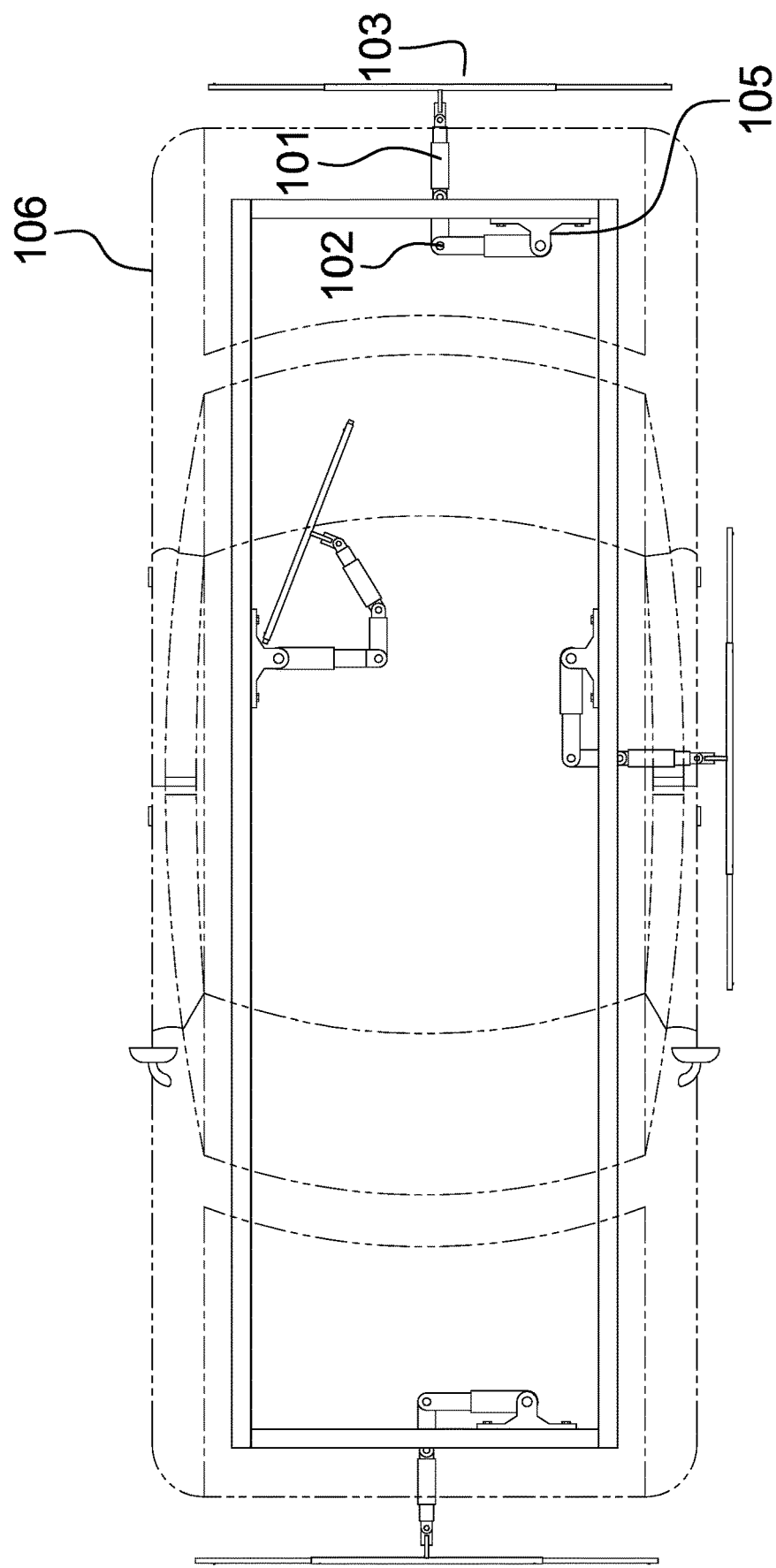
FIG. 4 is an in-use view of an embodiment of the disclosure.
Figure 5:
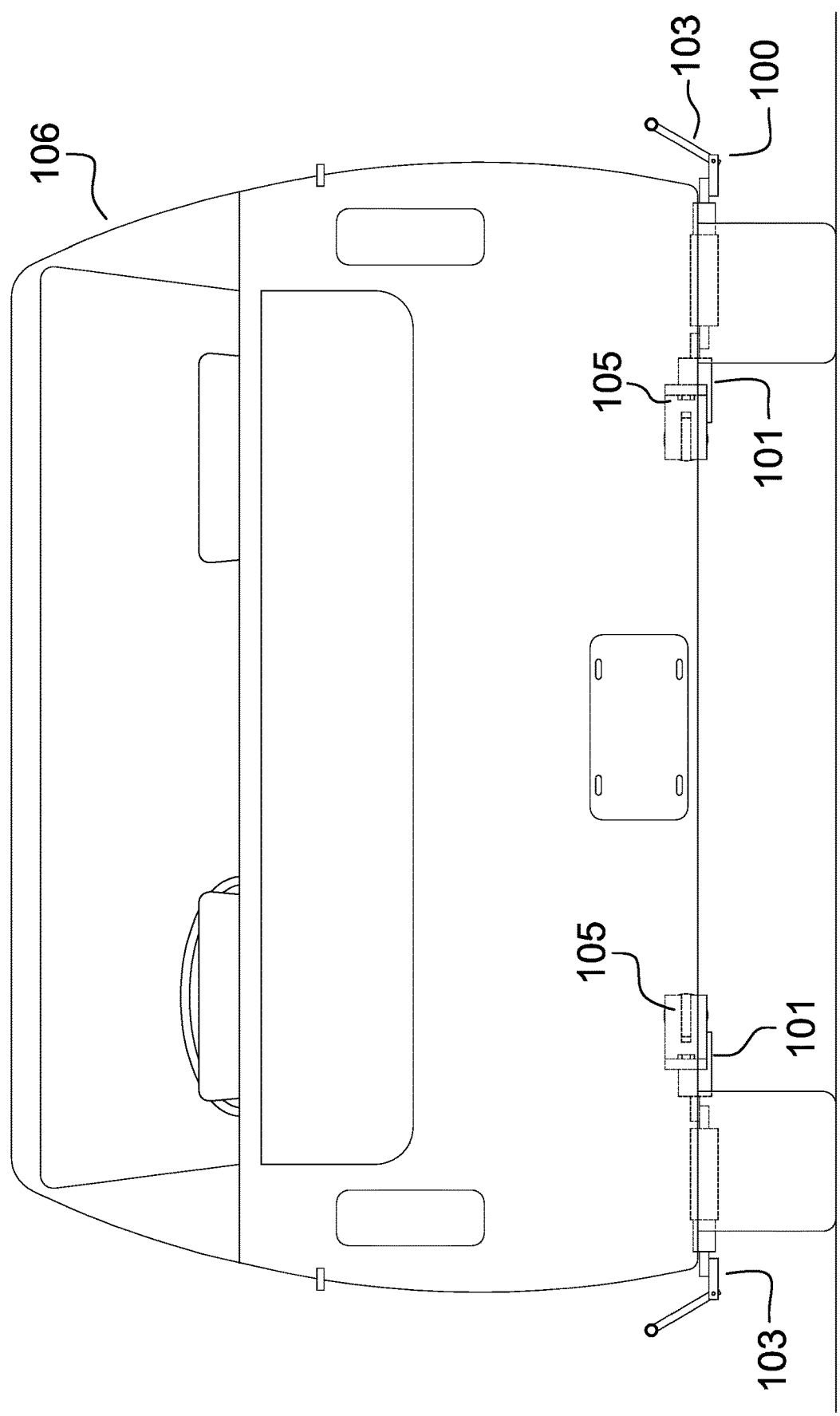
FIG. 5 is an in-use view of an embodiment of the disclosure.
Figure 6:
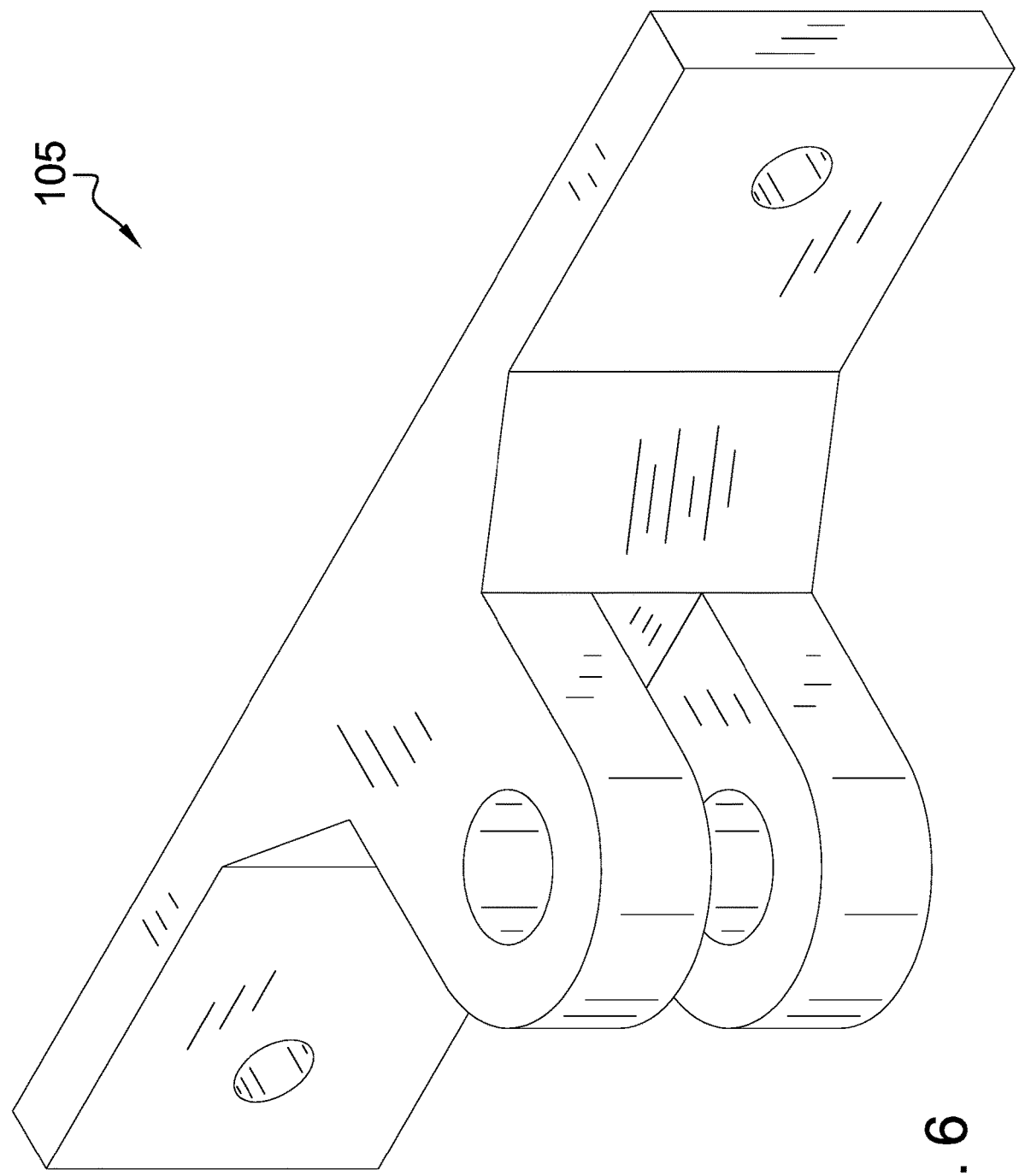
FIG. 6 is a detail view of an embodiment of the disclosure.
Figure 7:
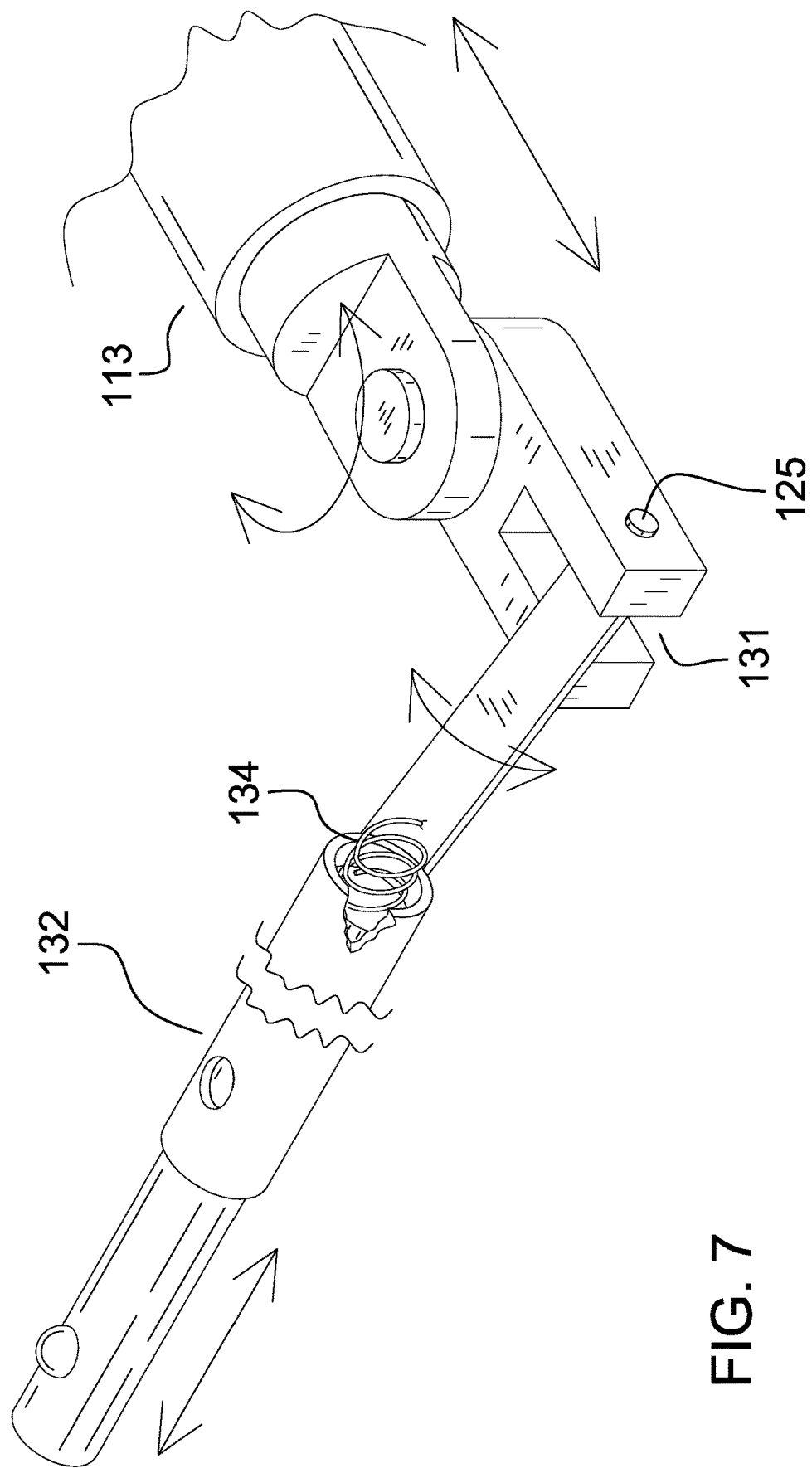
FIG. 7 is a detail view of an embodiment of the disclosure.

Detailed reference will now be made to one or more potential embodiments of the disclosure, which are illustrated in FIGS. 1 through 8.

The vehicle dent protection system 100 (hereinafter invention) is a mechanical structure. The invention 100 is configured for use with a vehicle 106. The invention 100 attaches to the vehicle 106. A plurality of instantiations of the invention 100 are attached to the vehicle 106 such that the plurality of instantiations forms a protected space around the vehicle 106. The invention 100 is a sacrificial structure 132 that receives and dissipates an impact before the impact can damage the vehicle 106.

The invention 100 comprises a plurality of telescopic structures 101, a plurality of pivot structures 102, a sacrificial module 103, and a frame mount 105. The plurality of pivot structures 102 interconnect the plurality of telescopic structures 101 such that the plurality of telescopic structures 101 can rotate. The plurality of telescopic structures 101 attach the sacrificial module 103 to the frame mount 105 such that the position of the sacrificial structure 132 relative to the frame mount 105 is adjustable. The frame mount 105 attaches the invention 100 to the vehicle 106.

The frame mount 105 is a mechanical structure. The frame mount 105 attaches the invention 100 to the frame of the vehicle 106. The vehicle 106 is defined elsewhere in this disclosure.

Each of the plurality of telescopic structures 101 is a mechanical structure. Each of the plurality of telescopic structures 101 is a composite prism structure. The plurality of telescopic structures 101 attaches the sacrificial module 103 to the frame mount 105. The span of the length of the center axis of the composite prism structure of each of the plurality of telescopic structures 101 is adjustable.

The plurality of telescopic structures 101 are interconnected such that any telescopic structure initially selected from the plurality of telescopic structures 101 attaches to one or more subsequently selected telescopic structures selected from the plurality of telescopic structures 101. The plurality of telescopic structures 101 are interconnected such that any telescopic structure initially selected from the plurality of telescopic structures 101 rotates relative to any subsequently selected telescopic structure selected from the plurality of telescopic structures 101.

The position of the sacrificial module 103 relative to the frame mount 105 adjusts by adjusting the span of the length of each of the plurality of telescopic structures 101. The position of the plurality of telescopic structures 101 relative to the frame mount 105 adjusts by adjusting the cant between the center axis of any initially selected telescopic structure selected from the plurality of telescopic structures 101 and any subsequently selected telescopic structure selected from the plurality of telescopic structures 101.

The plurality of telescopic structures 101 comprises a first telescopic structure 111, a second telescopic structure 112, and a third telescopic structure 113. The first telescopic structure 111 is a telescopic structure that extends the reach between the frame mount 105 and the second telescopic structure 112. The second telescopic structure 112 is a telescopic structure that adjusts the reach between the first telescopic structure 111 and the third telescopic structure 113. The third telescopic structure 113 is a telescopic structure that adjusts the reach between the second telescopic structure 112 and the sacrificial module 103.

The first telescopic structure 111 is a telescopic structure that comprises a first arm 151, a second arm 152, and a first detent structure 171. The first detent structure 171 is a mechanical device that locks and secures the first arm 151 to the second arm 152. The first arm 151 is a hollow prism structure that is further defined with an inner dimension. The second arm 152 is a hollow prism structure that is further defined with an outer dimension. The second arm 152 is geometrically similar to the first arm 151. The span of the outer dimension of the second arm 152 is lesser than the span of the inner dimension of the first arm 151 such that the second arm 152 inserts into the first arm 151 in a telescopic fashion to form a composite prism structure.

The span of the length of the first telescopic structure 111 adjusts by adjusting the relative position of the second arm 152 within the first arm 151. The position of the second arm 152 relative to the first arm 151 is held in position using the first detent structure 171. The first detent structure 171 is a detent that controls the movement of the second arm 152 within the first arm 151.

The second telescopic structure 112 is a telescopic structure that comprises a third arm 153, a fourth arm 154, and a second detent structure 172. The second detent structure 172 is a mechanical device that locks and secures the fourth arm 154 to the third arm 153. The third arm 153 is a hollow prism structure that is further defined with an inner dimension. The fourth arm 154 is a hollow prism structure that is further defined with an outer dimension. The fourth arm 154 is geometrically similar to the third arm 153. The span of the outer dimension of the third arm 153 is lesser than the span of the inner dimension of the fourth arm 154 such that the fourth arm 154 inserts into the third arm 153 in a telescopic fashion to form a composite prism structure.

The span of the length of the second telescopic structure 112 adjusts by adjusting the relative position of the third arm 153 within the fourth arm 154. The position of the third arm 153 relative to the fourth arm 154 is held in position using the second detent structure 172. The second detent structure 172 is a detent that controls the movement of the fourth arm 154 within the third arm 153.

The third telescopic structure 113 is a telescopic structure that comprises a fifth arm 155, a sixth arm 156, and a third detent structure 173. The third detent structure 173 is a mechanical device that locks and secures the fifth arm 155 to the sixth arm 156. The fifth arm 155 is a hollow prism structure that is further defined with an inner dimension. The sixth arm 156 is a hollow prism structure that is further defined with an outer dimension. The sixth arm 156 is geometrically similar to the fifth arm 155. The span of the outer dimension of the sixth arm 156 is lesser than the span of the inner dimension of the fifth arm 155 such that the sixth arm 156 inserts into the fifth arm 155 in a telescopic fashion to form a composite prism structure.

The span of the length of the third telescopic structure 113 adjusts by adjusting the relative position of the sixth arm 156 within the fifth arm 155. The position of the sixth arm 156 relative to the fifth arm 155 is held in position using the third detent structure 173. The third detent structure 173 is a detent that controls the movement of the sixth arm 156 within the fifth arm 155.

Each of the plurality of pivot structures 102 is a mechanical structure. Each of the plurality of pivot structures 102 attaches an initially selected telescopic structure selected from the plurality of telescopic structures 101 to a structure selected from the group consisting of: a) a subsequent telescopic structure selected from the plurality of telescopic structures 101; b) the sacrificial module 103; and, c) the frame mount 105. Each of the plurality of pivot structures 102 attaches the initially selected telescopic structure selected from the plurality of telescopic structures 101 to the selected structure such that the selected structure rotates relative to the initially selected telescopic structure. Each of the plurality of pivot structures 102 is a locking structure such that the position of the initially selected telescopic structure can be fixed relative to the sacrificial module 103 and the frame mount 105.

The plurality of pivot structures 102 comprises a first pivot 161 structure 121, a second pivot 162 structure 122, a third pivot 163 structure 123, a fourth pivot 164 structure 124, and a fifth pivot 165 structure 125.

The first pivot 161 structure 121 is a pivot that attaches the first telescopic structure 111 to the frame mount 105 such that the first telescopic structure 111 rotates relative to the frame mount 105. The first pivot 161 structure 121 is a locking structure that fixes the position of the first telescopic structure 111 relative to the frame mount 105. The first pivot 161 structure 121 comprises a first pivot 161 and a fourth detent structure 174.

The first pivot 161 is a prism-shaped structure. The first pivot 161 forms a shaft that attaches the frame mount 105 to the first telescopic structure 111 such that the first telescopic structure 111 rotates relative to the frame mount 105. The fourth detent structure 174 is a detent that controls the rotation of the first telescopic structure 111 relative to the frame mount 105.

The second pivot 162 structure 122 is a pivot that attaches the second telescopic structure 112 to the first telescopic structure 111 such that the second telescopic structure 112 rotates relative to the first telescopic structure 111. The second pivot 162 structure 122 is a locking structure that fixes the position of the second telescopic structure 112 relative to the first telescopic structure 111. The second pivot 162 structure 122 comprises a second pivot 162 and a fifth detent structure 175.

The second pivot 162 is a prism-shaped structure. The second pivot 162 forms a shaft that attaches the first telescopic structure 111 to the second telescopic structure 112 such that the second telescopic structure 112 rotates relative to the first telescopic structure 111. The fifth detent structure 175 is a detent that controls the rotation of the second telescopic structure 112 relative to the first telescopic structure 111.

The third pivot 163 structure 123 is a pivot that attaches the third telescopic structure 113 to the second telescopic structure 112 such that the third telescopic structure 113 rotates relative to the second telescopic structure 112. The third pivot 163 structure 123 is a locking structure that fixes the position of the third telescopic structure 113 relative to the second telescopic structure 112. The third pivot 163 structure 123 comprises a third pivot 163 and a sixth detent structure 176.

The third pivot 163 is a prism-shaped structure. The third pivot 163 forms a shaft that attaches the second telescopic structure 112 to the third telescopic structure 113 such that the third telescopic structure 113 rotates relative to the second telescopic structure 112. The sixth detent structure 176 is a detent that controls the rotation of the third telescopic structure 113 relative to the second telescopic structure 112.

The fourth pivot 164 structure 124 is a pivot that attaches the sacrificial module 103 to the third telescopic structure 113 such that the sacrificial module 103 rotates relative to the third telescopic structure 113. The fourth pivot 164 structure 124 is a locking structure that fixes the position of the sacrificial module 103 relative to the third telescopic structure 113. The fourth pivot 164 structure 124 comprises a fourth pivot 164 and a seventh detent structure 177.

The fourth pivot 164 is a prism-shaped structure. The fourth pivot 164 forms a shaft that attaches the third telescopic structure 113 to the extension structure 131 such that the extension structure 131 rotates relative to the third telescopic structure 113. The seventh detent structure 177 is a detent that controls the rotation of the extension structure 131 relative to the third telescopic structure 113.

The fifth pivot 165 structure 125 is a pivot that attaches the sacrificial module 103 to the third telescopic structure 113 such that the sacrificial module 103 rotates relative to the third telescopic structure 113. The fifth pivot 165 structure 125 is a locking structure that fixes the position of the sacrificial module 103 relative to the third telescopic structure 113. The plane formed by the rotation around the fifth pivot 165 structure 125 is perpendicular to the plane of rotation formed by the fourth pivot 164 structure 124. The fifth pivot 165 structure 125 comprises a fifth pivot 165 and an eighth detent structure 178.

The fifth pivot 165 is a prism-shaped structure. The fifth pivot 165 forms a shaft that attaches the third telescopic structure 113 to the extension structure 131 such that the extension structure 131 rotates relative to the third telescopic structure 113. The fifth pivot 165 is positioned relative to the fourth pivot 164 such that the center axis of the prism structure of the fifth pivot 165 is perpendicular to the center axis of the prism structure of the fourth pivot 164. The eighth detent structure 178 is a detent that controls the rotation of the extension structure 131 relative to the third telescopic structure 113.

The sacrificial module 103 is a mechanical structure. The sacrificial module 103 is a composite prism structure. The sacrificial module 103 is a boundary that creates a protected space around the vehicle 106. The sacrificial module 103 forms a barrier that receives an impact before the impact can reach the vehicle 106. The structure formed by the plurality of telescopic structures 101 and the plurality of pivot structures 102 extends the reach between the sacrificial module 103 and the vehicle 106 that creates the protected space. The sacrificial module 103 comprises an extension structure 131 and a sacrificial structure 132.

The extension structure 131 is a plastic structure. The extension structure 131 is a prism-shaped structure. The extension structure 131 forms a shaft that attaches to the sacrificial structure 132. The extension structure 131 extends the reach between the third telescopic structure 113 and the sacrificial structure 132.

The sacrificial structure 132 is a mechanical structure. The sacrificial structure 132 is a composite prism structure. The sacrificial structure 132 has a capped tube structure. The sacrificial structure 132 rigidly attaches to the extension structure 131 such that the center point of the center axis of the prism structure of the sacrificial structure 132 perpendicularly intersects with the center axis of the extension structure 131. The sacrificial structure 132 comprises a containment tube 133, a seventh arm 157, an eighth arm 158, a first compression spring 134, and a second compression spring 135.

The containment tube 133 is a mechanical structure. The containment tube 133 is a plastic structure. The containment tube 133 is a prism-shaped tubular structure. The containment tube 133 has a capped tube structure. The containment tube 133 forms the exterior component of the composite prism structure of the sacrificial structure 132.

The seventh arm 157 is a plastic prism-shaped structure. The seventh arm 157 is positioned to receive impacts from outside of the protected space formed by the invention 100. The seventh arm 157 inserts into the containment tube 133 to form a composite prism structure. The eighth arm 158 is a plastic prism-shaped structure. The eighth arm 158 is positioned to receive impacts from outside of the protected space formed by the invention 100. The eighth arm 158 inserts into the containment tube 133 to form a composite prism structure.

The first compression spring 134 is a compression spring that attaches the seventh arm 157 to the center barrier of the capped tube structure of the containment tube 133. The first compression spring 134 absorbs any impact energy that drives the seventh arm 157 into the containment tube 133. The second compression spring 135 is a compression spring that attaches the eighth arm 158 to the center barrier of the capped tube structure of the containment tube 133. The second compression spring 135 absorbs any impact energy that drives the eighth arm 158 into the containment tube 133. The compression spring is defined elsewhere in this disclosure.

In a second potential embodiment of the disclosure, the invention 100 further comprises a control circuit 104. The control circuit 104 is an electrical circuit that automates the deployment and retraction of the invention 100. The control circuit 104 controls the deployment and the retraction of the plurality of telescopic structures 101 and the plurality of pivot structures 102. The control circuit 104 comprises a logic module 141, an initiation signal 142, and a power source 143.

The logic module 141 is an electric circuit. The logic module 141 generates a plurality of motor controller signals 144. Each motor controller signal selected from the plurality of motor controller signals 144 controls a motor controller associated with a detent structure selected from the group consisting of: a) a detent structure associated with a telescopic structure selected from the plurality of telescopic structures 101; and, b) a detent structure associated with a pivot structure selected from the plurality of pivot structures 102. The logic module 141 monitors the initiation signal 142. Upon detection of the actuation of the initiation signal 142, the logic module 141 performs an action selected from the group consisting of: a) automatically deploying the invention 100; and, b) automatically retracting the invention 100. The logic module 141 further comprises a plurality of motor controller signals 144.

The power source 143 is a source of electrical energy used to power the operation of the logic module 141. The power source 143 is a source of electrical energy used to power the operation of the initiation signal 142. The power source 143 is a source of electrical energy used to power the operation of each detent structure associated with a telescopic structure selected from the plurality of telescopic structures 101. The power source 143 is a source of electrical energy used to power the operation of each detent structure associated with a pivot structure selected from the plurality of pivot structures 102. This disclosure assumes that the power source 143 is the electric system of the vehicle 106.

In the first potential embodiment of the disclosure, the first detent structure 171 further comprises a first motor 181 and a first motor 181 controller 191. The first motor 181 is an electrically powered servo motor. The first motor 181 provides the motive forces necessary to move the second arm 152 within the first arm 151. The first motor 181 controller 191 is an electric circuit. The first motor 181 controller 191 controls the direction of rotation of the first motor 181. The first motor 181 controller 191 controls the speed of rotation of the first motor 181.

The second detent structure 172 further comprises a second motor 182 and a second motor 182 controller 192. The second motor 182 is an electrically powered servo motor. The second motor 182 provides the motive forces necessary to move the fourth arm 154 within the third arm 153. The second motor 182 controller 192 is an electric circuit. The second motor 182 controller 192 controls the direction of rotation of the second motor 182. The second motor 182 controller 192 controls the speed of rotation of the second motor 182.

The third detent structure 173 further comprises a third motor 183 and a third motor 183 controller 193. The third motor 183 is an electrically powered servo motor. The third motor 183 provides the motive forces necessary to move the sixth arm 156 within the fifth arm 155. The third motor 183 controller 193 is an electric circuit. The third motor 183 controller 193 controls the direction of rotation of the third motor 183. The third motor 183 controller 193 controls the speed of rotation of the third motor 183.

The fourth detent structure 174 further comprises a fourth motor 184 and a fourth motor 184 controller 194. The fourth motor 184 is an electrically powered servo motor. The fourth motor 184 provides the motive forces necessary to rotate the first telescopic structure 111 relative to the frame mount 105. The fourth motor 184 controller 194 is an electric circuit. The fourth motor 184 controller 194 controls the direction of rotation of the fourth motor 184. The fourth motor 184 controller 194 controls the speed of rotation of the fourth motor 184.

The fifth detent structure 175 further comprises a fifth motor 185 and a fifth motor 185 controller 195. The fifth motor 185 is an electrically powered servo motor. The fifth motor 185 provides the motive forces necessary to rotate the second telescopic structure 112 relative to the first telescopic structure 111. The fifth motor 185 controller 195 is an electric circuit. The fifth motor 185 controller 195 controls the direction of rotation of the fifth motor 185. The fifth motor 185 controller 195 controls the speed of rotation of the fifth motor 185.

The sixth detent structure 176 further comprises a sixth motor 186 and a sixth motor 186 controller 196. The sixth motor 186 is an electrically powered servo motor. The sixth motor 186 provides the motive forces necessary to rotate the third telescopic structure 113 relative to the second telescopic structure 112. The sixth motor 186 controller 196 is an electric circuit. The sixth motor 186 controller 196 controls the direction of rotation of the sixth motor 186. The sixth motor 186 controller 196 controls the speed of rotation of the sixth motor 186.

The seventh detent structure 177 further comprises a seventh motor 187 and a seventh motor 187 controller 197. The seventh motor 187 is an electrically powered servo motor. The seventh motor 187 provides the motive forces necessary to rotate the extension structure 131 relative to the third telescopic structure 113. The seventh motor 187 controller 197 is an electric circuit. The seventh motor 187 controller 197 controls the direction of rotation of the seventh motor 187. The seventh motor 187 controller 197 controls the speed of rotation of the seventh motor 187.

The eighth detent structure 178 further comprises an eighth motor 188 and an eighth motor 188 controller 198. The eighth motor 188 is an electrically powered servo motor. The eighth motor 188 provides the motive forces necessary to rotate the extension structure 131 relative to the third telescopic structure 113. The eighth motor 188 controller 198 is an electric circuit. The eighth motor 188 controller 198 controls the direction of rotation of the eighth motor 188. The eighth motor 188 controller 198 controls the speed of rotation of the eighth motor 188.

Each of the plurality of motor controller signals 144 is a series of electric signals generated by the logic module 141. Each of the plurality of motor controller signals 144 provides operating instruction regarding the direction of rotation of its associated motor controller. The plurality of motor controller signals 144 provides operating instruction regarding the speed of rotation of its associated motor controller. The plurality of motor controller signals 144 further comprises a first motor 181 controller 191 signal 201, a second motor 182 controller 192 signal 202, a third motor 183 controller 193 signal 203, a fourth motor 184 controller 194 signal 204, a fifth motor 185 controller 195 signal 205, a sixth motor 186 controller 196 signal 206, a seventh motor 187 controller 197 signal 207, and an eighth motor 188 controller 198 signal 208.

The first motor 181 controller 191 signal 201 electrically connects the first motor 181 controller 191 to the logic module 141. The first motor 181 controller 191 signal 201 provides operating instructions from the logic module 141 to the first motor 181 controller 191.

The second motor 182 controller 192 signal 202 electrically connects the second motor 182 controller 192 to the logic module 141. The second motor 182 controller 192 signal 202 provides operating instructions from the logic module 141 to the second motor 182 controller 192.

The third motor 183 controller 193 signal 203 electrically connects the third motor 183 controller 193 to the logic module 141. The third motor 183 controller 193 signal 203 provides operating instructions from the logic module 141 to the third motor 183 controller 193.

The fourth motor 184 controller 194 signal 204 electrically connects the fourth motor 184 controller 194 to the logic module 141. The fourth motor 184 controller 194 signal 204 provides operating instructions from the logic module 141 to the fourth motor 184 controller 194.

The fifth motor 185 controller 195 signal 205 electrically connects the fifth motor 185 controller 195 to the logic module 141. The fifth motor 185 controller 195 signal 205 provides operating instructions from the logic module 141 to the fifth motor 185 controller 195.

The sixth motor 186 controller 196 signal 206 electrically connects the sixth motor 186 controller 196 to the logic module 141. The sixth motor 186 controller 196 signal 206 provides operating instructions from the logic module 141 to the sixth motor 186 controller 196.

The seventh motor 187 controller 197 signal 207 electrically connects the seventh motor 187 controller 197 to the logic module 141. The seventh motor 187 controller 197 signal 207 provides operating instructions from the logic module 141 to the seventh motor 187 controller 197.

The eighth motor 188 controller 198 signal 208 electrically connects the eighth motor 188 controller 198 to the logic module 141. The eighth motor 188 controller 198 signal 208 provides operating instructions from the logic module 141 to the eighth motor 188 controller 198.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Automatic: As used in this disclosure, automatic refers to a device, process, or a system that operates without human control, supervision or participation in the operation of the device, process, or system. The verb form of automatic is to automate.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center Capped Tube: As used in this disclosure, a center capped tube is a tube with a first open end, a second open end, and a barrier that is fabricated within the tube. The barrier prevents the flow of liquid or gas from the first open end of the tube through to the second open end of the tube.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compression Spring: As used in this disclosure, a compression spring is a spring that resists forces attempting to compress the spring in the direction of the center axis of the spring. The compression spring will return to its relaxed shape when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Extension Structure: As used in this disclosure, an extension structure is an inert physical structure that is used to extend or bridge the reach between any two objects.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Impact: As used in this disclosure, an impact refers to an exchange of momentum between two objects over a duration. An impact often refers to a collision between two objects.

Inner Dimension: As used in this disclosure, the term inner dimension describes the span from a first inside or interior surface of a container to a second inside or interior surface of a container. The term is used in much the same way that a plumber would refer to the inner diameter of a pipe.

Instantiation: As used in this disclosure, an instantiation refers to a specific physical object or process that is created using a specification.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Monomer: As used in this disclosure, a monomer refers to a molecular structure that bonds to itself in a repeating manner to form a polymer.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used determine the desired rotational speed and direction of rotation of the electric motor.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Organic: As used in this disclosure, organic refers to a carbon-based chemical structure. A limited number of carbon-based salts are traditionally considered inorganic chemical structures and are excluded from the study of organic chemistry.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Plastic: As used in this disclosure, plastic refers to a manufactured material that is formed from a structure selected from the group consisting of a polymer or a copolymer. Unless stated otherwise, this disclosure assumes that the plastic is formed from organic monomers.

Polymer: As used in this disclosure, a polymer refers to a molecular chain that comprises multiple repeating units known as monomers. The repeating unit may be an atom or a molecular structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary. Reach: As used in this disclosure, reach refers to a span of distance between any two objects.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Sacrificial Structure: As used in this disclosure, a sacrificial structure is a first object or structure that protects a second object or structure from damage. More specifically, the sacrificial structure protects the second object or structure by being damaged instead of the second object or structure.

Servo Motor: As used in this disclosure, a servo motor is an electrical motor that further incorporates a feedback circuit that allows for the precise angular positioning of the electric motor.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Tube: As used in this disclosure, the term tube is used to describe a rigid hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vehicle: As used in this disclosure, a vehicle is a device that is used for transporting passengers, goods, or equipment. The term motorized vehicle specifically refers to a vehicle that can move under power provided by an electric motor or an internal combustion engine. The term vehicle generically applies to motorized vehicles and vehicles without a motor.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle protection system comprising
a plurality of telescopic structures, a plurality of pivot structures, a sacrificial structure, and a frame mount;
wherein the vehicle protection system is configured for use in protection of a vehicle;
wherein the frame mount attaches the vehicle protection system to the vehicle;
wherein the plurality of pivot structures interconnect the plurality of telescopic structures such that the plurality of telescopic structures can rotate;
wherein the plurality of telescopic structures attach the sacrificial module to the frame mount such that the position of the sacrificial structure relative to the frame mount is adjustable;
wherein each of the plurality of pivot structures is a mechanical structure;
wherein each of the plurality of pivot structures attaches an initially selected telescopic structure selected from the plurality of telescopic structures to a structure selected from the group consisting of: a) a subsequent telescopic structure selected from the plurality of telescopic structures; b) the sacrificial module; and, c) the frame mount;
wherein each of the plurality of pivot structures attaches the initially selected telescopic structure selected from the plurality of telescopic structures to the selected structure such that the selected structure rotates relative to the initially selected telescopic structure;
wherein each of the plurality of pivot structures is a locking structure such that the position of the initially selected telescopic structure can be fixed relative to the sacrificial module and the frame mount.

2. The vehicle protection system according to claim 1
wherein the frame mount is a mechanical structure;
wherein the vehicle protection system is a mechanical structure;
wherein a plurality of instantiations of the vehicle protection system are attached to the vehicle such that the plurality of instantiations forms a protected space around the vehicle;
wherein each of the plurality of telescopic structures is a mechanical structure;
wherein the plurality of telescopic structures attaches the sacrificial module to the frame mount;
wherein the span of the length of a center axis of the composite structure of each of the plurality of telescopic structures is adjustable;
wherein the plurality of telescopic structures are interconnected such that any telescopic structure initially selected from the plurality of telescopic structures attaches to one or more subsequently selected telescopic structures selected from the plurality of telescopic structures;
wherein the plurality of telescopic structures are interconnected such that any telescopic structure initially selected from the plurality of telescopic structures rotates relative to any subsequently selected telescopic structure selected from the plurality of telescopic structures;
wherein the position of the sacrificial module relative to the frame mount adjusts by adjusting the span of the length of each of the plurality of telescopic structures;

wherein the position of the plurality of telescopic structures relative to the frame mount adjusts by adjusting the cant between a center axis of any initially selected telescopic structure selected from the plurality of telescopic structures and any subsequently selected telescopic structure selected from the plurality of telescopic structures.

3. The vehicle protection system according to claim 2
wherein the sacrificial module is a mechanical structure;
wherein the sacrificial module is a boundary that creates a protected space around the vehicle;
wherein the sacrificial module forms a barrier that receives an impact before the impact can reach the vehicle;
wherein the structure formed by the plurality of telescopic structures and the plurality of pivot structures extends the reach between the sacrificial module and the vehicle that creates the protected space.

4. The vehicle protection system according to claim 3
wherein the plurality of telescopic structures comprises a first telescopic structure, a second telescopic structure, and a third telescopic structure;
wherein the first telescopic structure is a telescopic structure that extends the reach between the frame mount and the second telescopic structure;
wherein the second telescopic structure is a telescopic structure that adjusts the reach between the first telescopic structure and the third telescopic structure;
wherein the third telescopic structure is a telescopic structure that adjusts the reach between the second telescopic structure and the sacrificial module.

5. The vehicle protection system according to claim 4
wherein the plurality of pivot structures comprises a first pivot structure, a second pivot structure, a third pivot structure, a fourth pivot structure, and a fifth pivot structure;
wherein the first pivot structure is a pivot that attaches the first telescopic structure to the frame mount such that the first telescopic structure rotates relative to the frame mount;
wherein the first pivot structure is a locking structure that fixes the position of the first telescopic structure relative to the frame mount;
wherein the second pivot structure is a pivot that attaches the second telescopic structure to the first telescopic structure such that the second telescopic structure rotates relative to the first telescopic structure;
wherein the second pivot structure is a locking structure that fixes the position of the second telescopic structure relative to the first telescopic structure;
wherein the third pivot structure is a pivot that attaches the third telescopic structure to the second telescopic structure such that the third telescopic structure rotates relative to the second telescopic structure;
wherein the third pivot structure is a locking structure that fixes the position of the third telescopic structure relative to the second telescopic structure;
wherein the fourth pivot structure is a pivot that attaches the sacrificial module to the third telescopic structure such that the sacrificial module rotates relative to the third telescopic structure;
wherein the fourth pivot structure is a locking structure that fixes the position of the sacrificial module relative to the third telescopic structure;
wherein the fifth pivot structure is a pivot that attaches the sacrificial module to the third telescopic structure such that the sacrificial module rotates relative to the third telescopic structure;
wherein the fifth pivot structure is a locking structure that fixes the position of the sacrificial module relative to the third telescopic structure;
wherein the plane formed by the rotation around the fifth pivot structure is perpendicular to the plane of rotation formed by the fourth pivot structure.

6. The vehicle protection system according to claim 5
wherein the sacrificial module comprises an extension structure and a sacrificial structure;
wherein the extension structure is a plastic structure;
wherein the extension structure forms a shaft that attaches to the sacrificial structure;
wherein the extension structure extends the reach between the third telescopic structure and the sacrificial structure;
wherein the sacrificial structure is a mechanical structure;
wherein the sacrificial structure has a capped tube structure;
wherein the sacrificial structure rigidly attaches to the extension structure such that the center point of a center axis of the sacrificial structure perpendicularly intersects with the center axis of the extension structure.

7. The vehicle protection system according to claim 6
wherein the first telescopic structure is a telescopic structure that comprises a first arm, a second arm, and a first detent structure;
wherein the first detent structure is a mechanical device that locks and secures the first arm to the second arm;
wherein the first arm is a hollow structure that is further defined with an inner dimension;
wherein the second arm is a hollow structure that is further defined with an outer dimension;
wherein the second arm is geometrically similar to the first arm;
wherein the span of the outer dimension of the second arm is lesser than the span of the inner dimension of the first arm such that the second arm inserts into the first arm in a telescopic fashion;
wherein the span of the length of the first telescopic structure adjusts by adjusting the relative position of the second arm within the first arm;
wherein the position of the second arm relative to the first arm is held in position using the first detent structure;
wherein the first detent structure controls the movement of the second arm within the first arm.

8. The vehicle protection system according to claim 7
wherein the second telescopic structure is a telescopic structure that comprises a third arm, a fourth arm, and a second detent structure;
wherein the second detent structure is a mechanical device that locks and secures the fourth arm to the third arm;
wherein the third arm is a hollow structure that is further defined with an inner dimension;
wherein the fourth arm is a hollow structure that is further defined with an outer dimension;
wherein the fourth arm is geometrically similar to the third arm;
wherein the span of the outer dimension of the third arm is lesser than the span of the inner dimension of the fourth arm such that the fourth arm inserts into the third arm in a telescopic fashion;

wherein the span of the length of the second telescopic structure adjusts by adjusting the relative position of the third arm within the fourth arm;
wherein the position of the third arm relative to the fourth arm is held in position using the second detent structure;
wherein the second detent structure controls the movement of the fourth arm within the third arm.

9. The vehicle protection system according to claim 8 wherein the third telescopic structure is a telescopic structure that comprises a fifth arm, a sixth arm, and a third detent structure;
wherein the third detent structure is a mechanical device that locks and secures the fifth arm to the sixth arm;
wherein the fifth arm is a hollow structure that is further defined with an inner dimension;
wherein the sixth arm is a hollow structure that is further defined with an outer dimension;
wherein the sixth arm is geometrically similar to the fifth arm;
wherein the span of the outer dimension of the sixth arm is lesser than the span of the inner dimension of the fifth arm such that the sixth arm inserts into the fifth arm in a telescopic fashion;
wherein the span of the length of the third telescopic structure adjusts by adjusting the relative position of the sixth arm within the fifth arm;
wherein the position of the sixth arm relative to the fifth arm is held in position using the third detent structure;
wherein the third detent structure controls the movement of the sixth arm within the fifth arm.

10. The vehicle protection system according to claim 9 wherein the first pivot structure comprises a first pivot and a fourth detent structure;
wherein the first pivot forms a shaft that attaches the frame mount to the first telescopic structure such that the first telescopic structure rotates relative to the frame mount;
wherein the fourth detent structure is a detent that controls the rotation of the first telescopic structure relative to the frame mount;
wherein the second pivot structure comprises a second pivot and a fifth detent structure;
wherein the second pivot forms a shaft that attaches the first telescopic structure to the second telescopic structure such that the second telescopic structure rotates relative to the first telescopic structure;
wherein the fifth detent structure is a detent that controls the rotation of the second telescopic structure relative to the first telescopic structure;
wherein the third pivot structure comprises a third pivot and a sixth detent structure;
wherein the third pivot forms a shaft that attaches the second telescopic structure to the third telescopic structure such that the third telescopic structure rotates relative to the second telescopic structure;
wherein the sixth detent structure is a detent that controls the rotation of the third telescopic structure relative to the second telescopic structure;
wherein the fourth pivot structure comprises a fourth pivot and a seventh detent structure;
wherein the fourth pivot forms a shaft that attaches the third telescopic structure to the extension structure such that the extension structure rotates relative to the third telescopic structure;
wherein the seventh detent structure is a detent that controls the rotation of the extension structure relative to the third telescopic structure;
wherein the fifth pivot structure comprises a fifth pivot and an eighth detent structure;
wherein the fifth pivot forms a shaft that attaches the third telescopic structure to the extension structure such that the extension structure rotates relative to the third telescopic structure;
wherein the fifth pivot is positioned relative to the fourth pivot such that a center axis of the fifth pivot is perpendicular to the center axis of the fourth pivot;
wherein the eighth detent structure is a detent that controls the rotation of the extension structure relative to the third telescopic structure.

11. The vehicle protection system according to claim 10 wherein the sacrificial structure comprises a containment tube, a seventh arm, an eighth arm, a first compression spring, and a second compression spring;
wherein the containment tube is a mechanical structure;
wherein the containment tube is a plastic structure;
wherein the containment tube is a tubular structure;
wherein the containment tube has a capped tube structure;
wherein the containment tube forms the exterior component of the composite structure of the sacrificial structure;
wherein the seventh arm is a plastic structure;
wherein the seventh arm is positioned to receive impacts from outside of the protected space formed by the vehicle protection system;
wherein the seventh arm inserts into the containment tube;
wherein the eighth arm is a plastic structure;
wherein the eighth arm is positioned to receive impacts from outside of the protected space formed by the vehicle protection system;
wherein the eighth arm inserts into the containment tube;
wherein the first compression spring is a compression spring that attaches the seventh arm to the center barrier of the capped tube structure of the containment tube;
wherein the first compression spring absorbs any impact energy that drives the seventh arm into the containment tube;
wherein the second compression spring is a compression spring that attaches the eighth arm to the center barrier of the capped tube structure of the containment tube;
wherein the second compression spring absorbs any impact energy that drives the eighth arm into the containment tube.

12. The vehicle protection system according to claim 11 wherein the vehicle protection system further comprises a control circuit;
wherein the control circuit is an electrical circuit that automates the deployment and retraction of the vehicle protection system;
wherein the control circuit controls the deployment and the retraction of the plurality of telescopic structures and the plurality of pivot structures.

13. The vehicle protection system according to claim 12 wherein the control circuit comprises a logic module, an initiation signal, and a power source;
wherein the logic module monitors the initiation signal;
wherein the logic module is an electric circuit;
wherein the power source is a source of electrical energy used to power the operation of the logic module;
wherein the power source is a source of electrical energy used to power the operation of the initiation signal;

wherein the power source is a source of electrical energy used to power the operation of each detent structure associated with a pivot structure selected from the plurality of pivot structures.

14. The vehicle protection system according to claim 13
wherein the logic module further comprises a plurality of motor controller signals;
wherein each motor controller signal selected from the plurality of motor controller signals controls a motor controller associated with a detent structure selected from the group consisting of: a) a detent structure associated with a telescopic structure selected from the plurality of telescopic structures; and, b) a detent structure associated with a pivot structure selected from the plurality of pivot structures;
wherein upon detection of the actuation of the initiation signal, the logic module performs an action selected from the group consisting of: a) automatically deploying the vehicle protection system; and, b) automatically retracting the vehicle protection system.

15. The vehicle protection system according to claim 14
wherein each of the plurality of motor controller signals is a series of electric signals generated by the logic module;
wherein each of the plurality of motor controller signals provides operating instruction regarding the direction of rotation of its associated motor controller;
wherein the plurality of motor controller signals provides operating instruction regarding the speed of rotation of its associated motor controller.

16. The vehicle protection system according to claim 15
wherein the first detent structure further comprises a first motor and a first motor controller;
wherein the first motor is an electrically powered servo motor;
wherein the first motor provides the motive forces necessary to move the second arm within the first arm;
wherein the first motor controller is an electric circuit;
wherein the first motor controller controls the direction of rotation of the first motor;
wherein the first motor controller controls the speed of rotation of the first motor;
wherein the second detent structure further comprises a second motor and a second motor controller;
wherein the second motor is an electrically powered servo motor;
wherein the second motor provides the motive forces necessary to move the fourth arm within the third arm;
wherein the second motor controller is an electric circuit;
wherein the second motor controller controls the direction of rotation of the second motor;
wherein the second motor controller controls the speed of rotation of the second motor;
wherein the third detent structure further comprises a third motor and a third motor controller;
wherein the third motor is an electrically powered servo motor;
wherein the third motor provides the motive forces necessary to move the sixth arm within the fifth arm;
wherein the third motor controller is an electric circuit;
wherein the third motor controller controls the direction of rotation of the third motor;
wherein the third motor controller controls the speed of rotation of the third motor.

17. The vehicle protection system according to claim 16
wherein the fourth detent structure further comprises a fourth motor and a fourth motor controller;
wherein the fourth motor is an electrically powered servo motor;
wherein the fourth motor provides the motive forces necessary to rotate the first telescopic structure relative to the frame mount;
wherein the fourth motor controller is an electric circuit;
wherein the fourth motor controller controls the direction of rotation of the fourth motor;
wherein the fourth motor controller controls the speed of rotation of the fourth motor;
wherein the fifth detent structure further comprises a fifth motor and a fifth motor controller;
wherein the fifth motor is an electrically powered servo motor;
wherein the fifth motor provides the motive forces necessary to rotate the second telescopic structure relative to the first telescopic structure;
wherein the fifth motor controller is an electric circuit;
wherein the fifth motor controller controls the direction of rotation of the fifth motor;
wherein the fifth motor controller controls the speed of rotation of the fifth motor;
wherein the sixth detent structure further comprises a sixth motor and a sixth motor controller;
wherein the sixth motor is an electrically powered servo motor;
wherein the sixth motor provides the motive forces necessary to rotate the third telescopic structure relative to the second telescopic structure;
wherein the sixth motor controller is an electric circuit;
wherein the sixth motor controller controls the direction of rotation of the sixth motor;
wherein the sixth motor controller controls the speed of rotation of the sixth motor;
wherein the seventh detent structure further comprises a seventh motor and a seventh motor controller;
wherein the seventh motor is an electrically powered servo motor;
wherein the seventh motor provides the motive forces necessary to rotate the extension structure relative to the third telescopic structure;
wherein the seventh motor controller is an electric circuit;
wherein the seventh motor controller controls the direction of rotation of the seventh motor;
wherein the seventh motor controller controls the speed of rotation of the seventh motor;
wherein the eighth detent structure further comprises an eighth motor and an eighth motor controller;
wherein the eighth motor is an electrically powered servo motor;
wherein the eighth motor provides the motive forces necessary to rotate the extension structure relative to the third telescopic structure;
wherein the eighth motor controller is an electric circuit;
wherein the eighth motor controller controls the direction of rotation of the eighth motor;
wherein the eighth motor controller controls the speed of rotation of the eighth motor.

18. The vehicle protection system according to claim 17
wherein the plurality of motor controller signals further comprises a first motor controller signal, a second motor controller signal, a third motor controller signal, a fourth motor controller signal, a fifth motor controller signal, a sixth motor controller signal, a seventh motor controller signal, and an eighth motor controller signal;
wherein the first motor controller signal electrically connects the first motor controller to the logic module;

wherein the first motor controller signal provides operating instructions from the logic module to the first motor controller;

wherein the second motor controller signal electrically connects the second motor controller to the logic module;

wherein the second motor controller signal provides operating instructions from the logic module to the second motor controller;

wherein the third motor controller signal electrically connects the third motor controller to the logic module;

wherein the third motor controller signal provides operating instructions from the logic module to the third motor controller;

wherein the fourth motor controller signal electrically connects the fourth motor controller to the logic module;

wherein the fourth motor controller signal provides operating instructions from the logic module to the fourth motor controller;

wherein the fifth motor controller signal electrically connects the fifth motor controller to the logic module;

wherein the fifth motor controller signal provides operating instructions from the logic module to the fifth motor controller;

wherein the sixth motor controller signal electrically connects the sixth motor controller to the logic module;

wherein the sixth motor controller signal provides operating instructions from the logic module to the sixth motor controller;

wherein the seventh motor controller signal electrically connects the seventh motor controller to the logic module;

wherein the seventh motor controller signal provides operating instructions from the logic module to the seventh motor controller;

wherein the eighth motor controller signal electrically connects the eighth motor controller to the logic module;

wherein the eighth motor controller signal provides operating instructions from the logic module to the eighth motor controller.

\* \* \* \* \*